No. 689,633. Patented Dec. 24, 1901.
A. R. BRADEN.
VEHICLE HUB.
(Application filed Apr. 18, 1901.)
(No Model.)
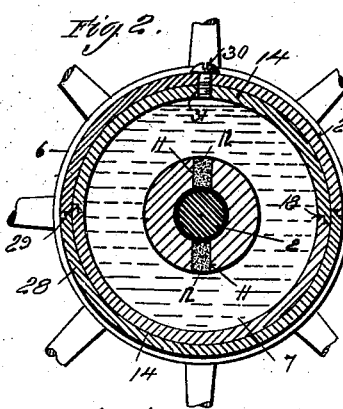
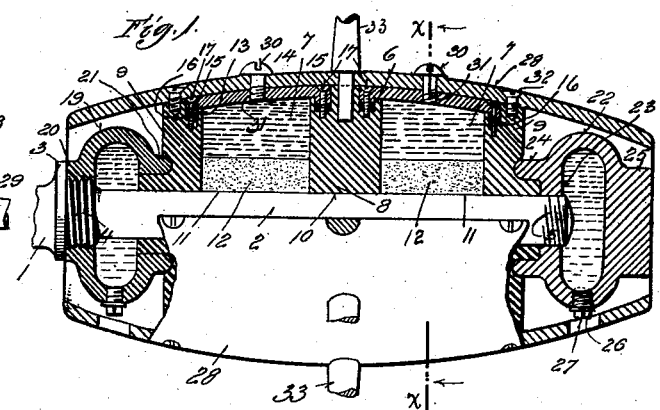
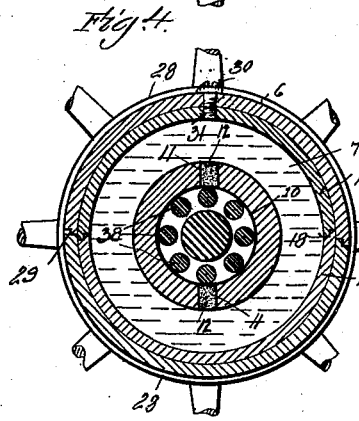
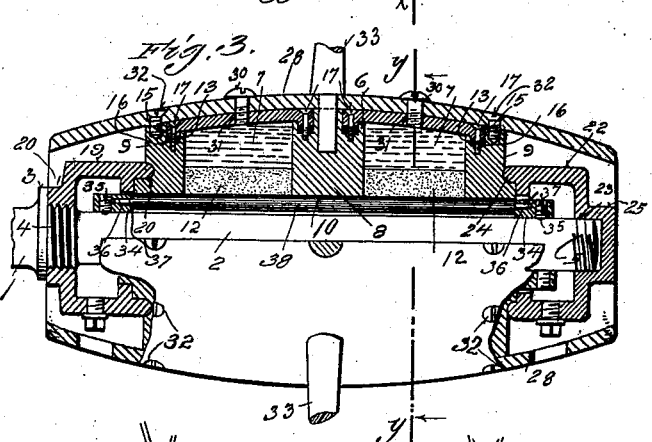
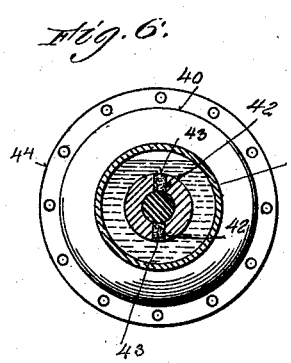
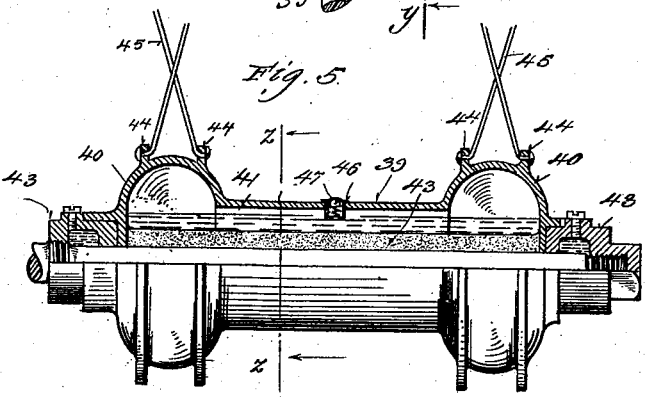
WITNESSES:
INVENTOR
Alfred R. Braden
BY
ATTORNEY.

UNITED STATES PATENT OFFICE.

ALFRED R. BRADEN, OF SPRINGFIELD, OHIO.

VEHICLE-HUB.

SPECIFICATION forming part of Letters Patent No. 689,633, dated December 24, 1901.

Application filed April 18, 1901. Serial No. 56,354. (No model.)

*To all whom it may concern:*

Be it known that I, ALFRED R. BRADEN, a citizen of the United States, residing at Springfield, in the county of Clark and State of Ohio, have invented certain new and useful Improvements in Vehicle-Hubs, of which the following is a specification, reference being had therein to the accompanying drawings.

This invention relates to vehicle-hubs, and more particularly to that class known as "lubricated" hubs, and has for its object to provide an efficient construction whereby the hub may be so lubricated as to run for a great length of time without requiring a renewal of the supply of the lubricant, the construction being such that a fresh supply of the lubricant may be provided without the removal of the wheel from the axle, while the waste or drip of the lubricant is properly cared for.

To these and other ends my invention consists in certain novel features, which I will now proceed to describe and will then particularly point out in the claims.

In the accompanying drawings, Figure 1 is a view, partly in elevation and partly in section, of a hub embodying my improvements in one form. Fig. 2 is a transverse sectional view of the same, taken on the line $xx$ of Fig. 1 and looking in the direction of the arrows. Fig. 3 is a sectional view, similar to Fig. 1, showing a hub having roller-bearings. Fig. 4 is a transverse sectional view taken on the line $yy$ of Fig. 3 and looking in the direction of the arrows. Fig. 5 is a sectional view similar to Figs. 1 and 2, illustrating a metallic hub for use in connection with a metallic wheel of the suspension type; and Fig. 6 is a sectional view taken on the line $zz$ of Fig. 5 and looking in the direction of the arrows.

Referring first to the construction shown in Figs. 1 and 2, in which I have shown my invention as applied to a wooden hub, 1 indicates the axle, and 2 the skein or spindle, there being provided at the junction of the two a collar 3 and a threaded portion 4, while the spindle is provided at its free end with a threaded portion 5. These parts may be of any approved construction.

6 indicates the body of the hub, which is provided with two circumferential grooves or recesses 7, forming chambers to receive the lubricant, these recesses being separated by a central annular portion 8 of the body of the hub and being bounded at the ends by similar annular portions 9. This body portion of the hub is provided with the usual central bore or longitudinal aperture 10 to fit upon the spindle 2. From each of the oil-chambers 7 there extend through the body of the hub a plurality of radial slots or openings 11, and in connection with each chamber I have shown in the present instance two such slots, although the number may be varied as desired. Each slot is provided with a filling 12, of felt or other suitable fibrous or porous material, which serves to regulate the flow of the oil from the chambers to the axle-spindle. Surrounding each margin of each of the annular chambers 7 on the outer face of the body of the hub is formed an annular seat or recess 13, and each annular chamber is closed at the outside by annular sectional plates 14, having flanges 15 to fit the seats 13. The seats are preferably provided with packing-gaskets 16, of any suitable material to form tight joints, and the sectional plates are secured in position by screws 17, passing through the plates and into the body of the hub. In the present instance I have shown each plate as composed of two sections, the meeting edges of which are provided with rabbeted joints, as indicated at 18.

In order to hold the body of the hub in position on the spindle and at the same time provide for the collection of the lubricant, I employ at each end of the hub cups suitably secured to the spindle.

19 indicates the cup at the inner end of the spindle, having a body hollow to form a reservoir and provided at one end with a threaded collar 20 to screw upon the threaded portion 4 of the spindle and abut against the collar 3 thereon. The other end of the cup 19 is provided with a thimble 21, which fits in a suitable seat in the end of the body of the hub and forms a tight joint to prevent the escape of the lubricant.

22 indicates the cup at the outer end of the hub, having a similar hollow body to receive the lubricant and a threaded sleeve or collar 23 to fit upon the threaded end 5 of the spindle. This cup is provided with a thimble portion 24, which fits in a suitable seat in the end of the hub to make a tight joint, and its closed outer end 25 may be formed into a wrench-grasp, the entire cup thus serving as an axle-nut. If desired, each cup may be provided with a drainage-aperture 26, closed by a screw-plug 27, as indicated at the outer end in Fig. 1.

The entire hub so far as thus described is inclosed in an outer shell composed of a plurality of suitably-formed plates 28, two of such plates being shown in the present instance. These plates fit over the body of the hub and extend beyond the same sufficiently to cover and protect the cups 19 and 22. Their meeting edges are preferably united by rabbeted joints, as indicated at 29, and they are preferably secured in position by means of screws 30, which pass through suitable apertures in the plates 28 and screw into threaded apertures 31 in the sectional plates 14. These apertures 31 pass entirely through the plates 14, so that by removing the said screws access may be had to the channels 7 to replenish the lubricant therein. The shell-plates 28 are secured to the body of the hub by means of screws 32, taking into the annular portions 9 of said body.

The spokes of the wheel, which are indicated at 33, pass through suitable apertures in the shell-plates 28 and are tenoned into the central annular portion 8 of the body of the hub, which thus affords a firm support and connection for said spokes.

In Figs. 3 and 4 I have illustrated a construction which is in the main identical with that described in connection with Figs. 1 and 2. I have, however, in this construction made provision for a roller-bearing, and to this end I have secured to the spindle 2, near each end thereof, a collar 34, held in place by set-screws 35, these collars being provided with bearings 36, in which are inserted the gudgeons 37 of a plurality of rollers 38. The bore 10 of the hub is sufficiently enlarged to receive these rollers, which thus serve to materially reduce the friction between the hub and spindle.

In Figs. 5 and 6 I have shown a metallic hub 39, the body portion of which is enlarged near each end, as indicated at 40, thus forming two lubricant-chambers which are connected by an annular passage 41. Radial slots 42, provided with a filling of felt or the like, (indicated at 43,) connect the lubricant-reservoir with the bore of the hub where it contacts with the spindle. Cups 43 are secured on the spindle at each end of the hub to receive the waste lubricant in the manner hereinbefore described. In this construction the enlarged portions of the hub are provided with flanges 44, to which the spokes 45 may be conveniently attached. 46 indicates a suitable filling-chamber for the oil-reservoir, provided with a suitable closure 47.

It will be observed that my improved hub after being once provided with a filling of oil may be used for a very long period without necessitating the provision of a fresh supply of lubricant and that this fresh supply may be provided without removing the wheel from the axle. It will also be observed that provision is made for receiving the lubricant after it has done its work and for preventing the same from dripping or escaping.

I do not wish to be understood as limiting myself to the precise details hereinbefore described, and shown in the drawings, as such details may obviously be modified without departing from the principle of my invention.

Having thus fully described my invention, what I claim as new, and desire to secure by Letters Patent, is—

1. The combination with a vehicle-hub having a lubricating-chamber extending entirely around the body of the same and a passage leading therefrom to the spindle, said passage being provided with a filling of felt or the like, of a spindle on which said hub is mounted, and cups secured on said spindle near each end thereof, said cups forming reservoirs to receive the drip and being provided with inwardly-extending thimbles, and the hub being provided with seats to receive said thimbles, said seats having shoulders against which the thimbles abut, substantially as described.

2. The combination, with a hub having annular recesses forming oil-receptacles at each end of its body portion, and radial slots extending from said recesses to the central opening of the hub and provided with a filling of felt or the like, of removable closures for the openings of said receptacles, a spindle on which said hub is mounted, and cups mounted on said spindle near each end thereof, said cups forming reservoirs to receive the drip and being provided with thimbles, and the hub having terminal seats to receive said thimbles, substantially as described.

3. A vehicle-hub comprising a body having a central spindle-opening, and annular oil-chambers provided with radial slots communicating with the spindle-opening, said slots having fillings of felt or the like, and said body portion being provided with marginal seats at the openings of said oil-chambers, and sectional plates adapted to fit said seats and be secured to said hub-body, substantially as described.

4. The combination, with the hub-body having the annular oil-chambers, and marginal seats at the openings thereof provided with packing, of the sectional closing-plates having flanges to fit said seats, and rabbeted meeting joints, and screws for securing said plates to the body of the hub, substantially as described.

5. A vehicle-hub comprising a body portion having annular lubricating-chambers, and felt-filled slots connecting the same with the spindle-opening, sectional plates secured to the body portion and closing the external openings of said chambers, a spindle having cups mounted thereon forming reservoirs to receive the drip, and engaging seats in the ends of the hub-body, and a divided external shell secured to the hub-body and projecting over the cup, substantially as described.

6. The combination, with a vehicle-hub having a lubricating-chamber and a passage leading therefrom to the spindle, said passage being provided with a filling of felt or the like, of a spindle on which said hub is mounted, and cups secured on said spindle near each end thereof, said cups forming reservoirs to receive the drip and being provided on their under sides with drainage-apertures having suitable closures, said cups being also provided with inwardly-extending thimbles, and the hub being provided with seats to receive said thimbles, substantially as described.

7. The combination, with a spindle, of collars adjustably mounted on said spindle and provided with set-screws whereby they may be secured thereon after adjustment, rollers having their ends mounted in said collars, a hub bearing on said rollers and provided with an annular lubricating-chamber and an outlet for the lubricant, the hub-opening being of greater diameter than the spindle and its collars and rollers to permit the removal of the hub without removing the rollers and collars, and lubricant-retaining cups secured on the spindle at the ends of the hub, substantially as described.

In testimony whereof I affix my signature in presence of two witnesses.

ALFRED R. BRADEN.

Witnesses:
WM. O'LAUGHLIN,
F. W. SCHAEFER.